June 1, 1965 J. H. WHITMORE 3,187,253
APPARATUS FOR MEASURING THE STRAIGHTNESS OF A
TRAVEL OF A MOVABLE MEMBER
Filed April 27, 1961 3 Sheets-Sheet 1

JOHN H. WHITMORE
INVENTOR

JOHN H. WHITMORE
INVENTOR

June 1, 1965

J. H. WHITMORE 3,187,253

APPARATUS FOR MEASURING THE STRAIGHTNESS OF A TRAVEL OF A MOVABLE MEMBER

Filed April 27, 1961

JOHN H. WHITMORE
INVENTOR

United States Patent Office 3,187,253
Patented June 1, 1965

3,187,253
APPARATUS FOR MEASURING THE STRAIGHT-NESS OF TRAVEL OF A MOVABLE MEMBER
John H. Whitmore, Binghamton, N.Y., assignor to General Precision, Inc., Binghamton, N.Y., a corporation of Delaware
Filed Apr. 27, 1961, Ser. No. 106,113
4 Claims. (Cl. 324—61)

This invention relates to methods and means for measuring the straightness of travel of linear motion mechanisms, such as by way of example, machine tool tables, measuring apparatus tables, and the like.

In the machine tool, precision measurement, photogrammetry, and like arts, devices are needed for measuring to a very high degree of precision the straightness of travel of carriages with respect to the bases upon which they are translatably mounted. In these arts it is necessary that such measurements be made rapidly and to a high degree of accuracy.

It is therefore an object of this invention to provide a precise means for measuring the straightness of travel of linear motion mechanisms such as machine tables in the most direct manner possible, and with a minimum of intermediate steps, preferably entirely automatically.

A further object of this invention is to provide a device which will accurately measure and respond only to lateral motion deviations perpendicular to a vertical plane. More particularly, it is an object of this invention to provide measuring means whereby the vertical motions of a machine carriage, as it traverses its motion range, do not affect the readings of the measurement system.

Yet another object of this invention is to provide a travel straightness measurement system which operates by direct electrical readout such that a complete travel straightness characteristic of a mechanism may be obtained in a very short time, on the order of minutes or seconds.

Yet another object of this invention consists in providing a travel straightness measurement system which is capable of producing a record of travel straightness deviations automatically and in a very short time, thus greatly minimizing the problem of temperature changes during the measurement period, and obviating the necessity for extremely precisely temperature controlled measurement environments.

A further object of this invention is to provide improved travel straightness measurement systems characterized by their ability to measure rapidly and automatically over wider ranges than prior art devices, for example in the order of several meters.

Still another object of this invention is to provide travel straightness measuring means capable of displaying lateral displacements of smaller magnitudes than has been previously possible, for example in the order of micro-inches.

Yet another object of this invention is to provide travel straightness measurement means of adjustable sensitivity such that carriages displaying large differences in travel trueness may be readily tested with the same measurement equipment.

Other objects of the invention will in part be obvious and will in part appear hereinafter.

The invention accordingly comprises the several steps and the relation of one or more of such steps with respect to each of the others, and the apparatus embodying features of construction, combinations of elements, and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawings, in which.

Figure 4A:
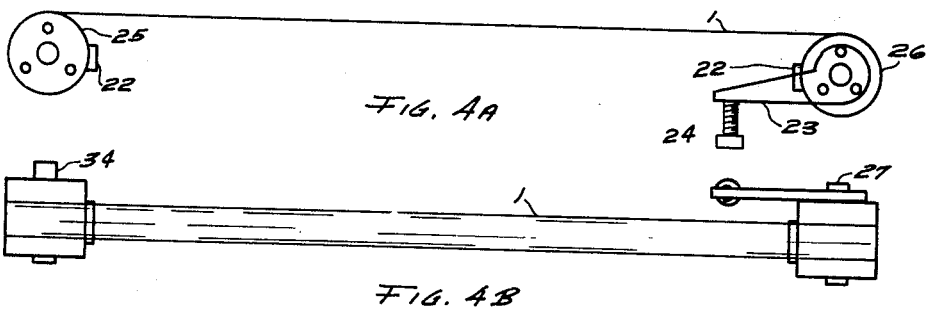
Figure 4B:
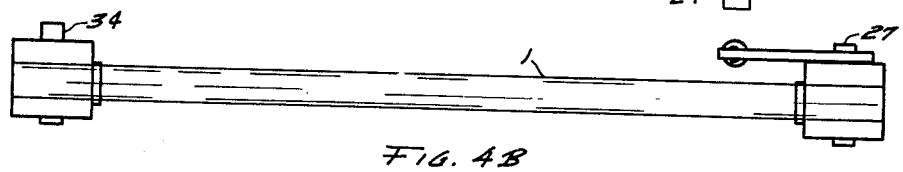

FIGURES 4A and 4B constitute plan and elevation views, respectively, of the ribbon like conductive straightness reference member of the instant invention, and the anchor means for anchoring said straightness reference member to the carriage the trueness of which is to be measured.

Figure 5:
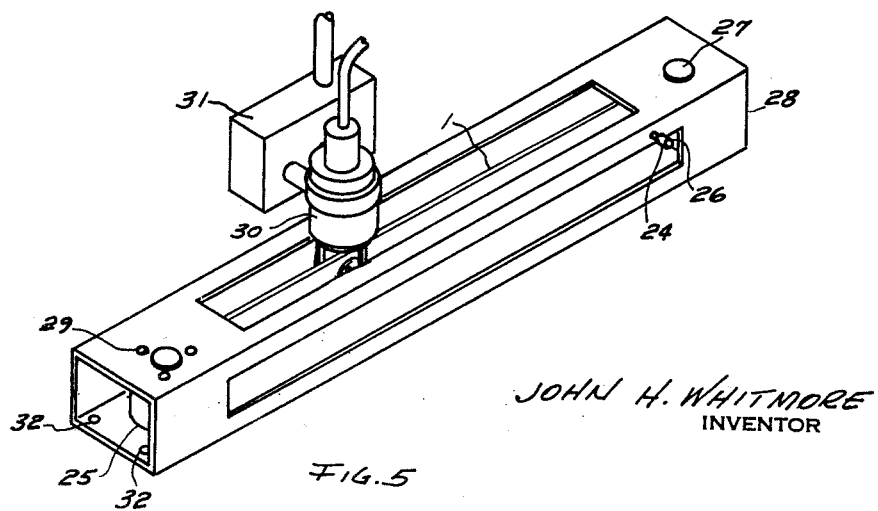

FIGURE 5 represents a travel straightness measuring apparatus according to the instant invention which may, for instance, be mounted on the carriage of a machine tool for rapidly and accurately checking the straightness of travel thereof.

Figure 6A:
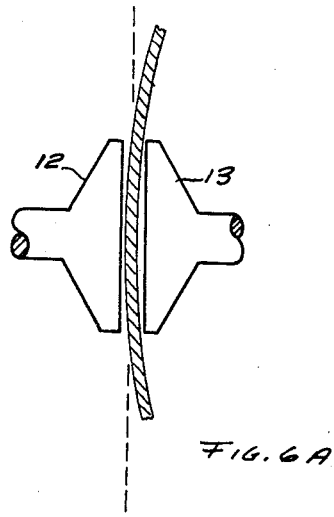
Figure 6B:
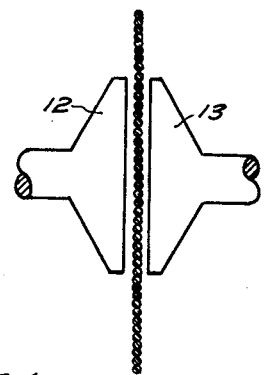

FIGURES 6A and 6B show two embodiments of the ribbon like conductive straightness reference member which may be employed in carrying out the instant invention.

Figure 1:
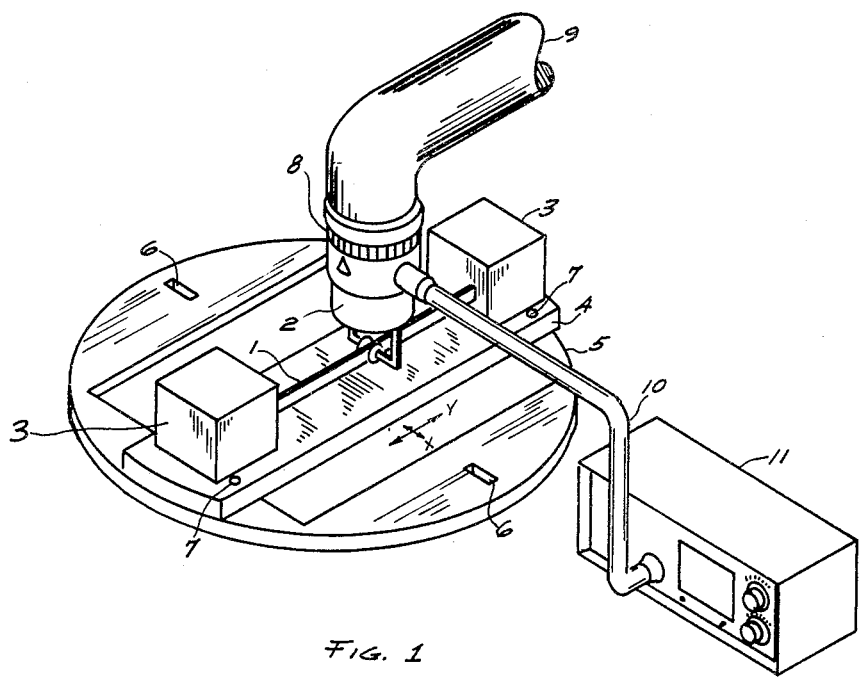
FIGURE 1 represents a travel straightness measurement system according to the principles of the instant invention which is capable of measuring straightness of travel along a first line Y, and along a line X perpendicular thereto.
Figure 1A:
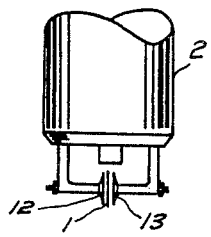
FIGURE 1A is a detailed view illustrating the relationship between the pickup transducer means of the instant invention and the reference member thereof which is mounted upon the carriage to be measured.

Referring to FIGURE 1, the ribbon like conductive straightness reference member 1 may be seen to be held in taut relation by anchorages 3. This conductive straightness reference member 1 is shown in more detail in the embodiments illustrated in FIGURES 6A and 6B. In both embodiments said member is of ribbon-like construction, and is sufficiently conductive so as to permit the effective operation of the electrical detection circuit associated therewith. The embodiment shown in FIGURE 6A comprises a thin foil which may, for instance, be constituted of stainless steel. As noted in FIGURE 6A, however, the foil type of straightness reference member may, unless constructed with great care, be characterized by bowing, or cambering, which is caused by internal stresses within the foil from either slitting or rolling. Another embodiment of conductive straightness reference member 1 is shown in FIGURE 6B which is comprised of a plurality of individual wires in substantially side-by-side relationship and provides a flat reference surface which is not characterized by the bow, or camber of the foil embodiment. Alternate constructions of the conductive reference member may, of course, be employed in carrying out this aspect of the instant invention. Further reference to FIGURE 1 will show that anchors 3 are mounted on a baseplate 4. Baseplate 4 is in turn mounted upon rotary table 5. For the purpose of squareness testing measuring the straightness of travel of a machine carriage upon which rotary table 5 is mounted first in the Y direction and then in the X direction, locators 6 are provided such that baseplate 4 may be unlocked from its position in the Y axis direction by means of locating pins 7 and then relocated along the X axis and locked in that direction by means of locating pins 7 and locators 6. Suitable means are, of course, provided for changing the direction of transducer 2 by 90 degrees when the direction of straightness reference member 1 is changed. Transducer 2, which is shown in more detail in FIGURE 1A, is suspended from rotary positioning means 8, which is in turn suspended from arm 9 which will be, in a preferred embodiment of the instant invention, rigidly affixed to the base portion of the mechanism upon which the carriage trueness measurements are to be performed. Rotary table 5, on the other hand, will, in a preferred embodiment of the instant invention, be affixed to the carriage member of the mechanism upon which the carriage trueness measurements are to be made. Alternatively, arm 9 may in some instances be affixed to the carriage while, on the other hand, rotary table 5 may be affixed to the base member of the mechanism the trueness of which is to be measured. Transducer 2, which is shown in mechanical detail in FIGURE 1A and in electrical detail in FIGURE 2, is interconnected by means of cable 10 to a suitable electronic circuit by which the unbalance of capacity between straightness reference member 1 and the measuring heads 12 and 13 may be indicated in terms of microinch displacement.

Figure 2:
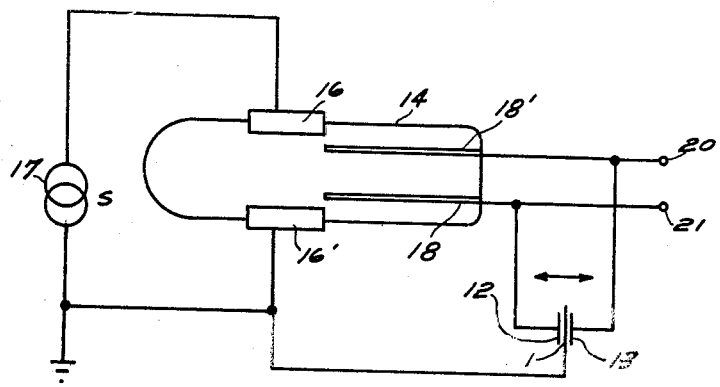
FIGURE 2 is a schematic diagram of a displacement transducer which may be used in connection with the instant invention.
Figure 3:
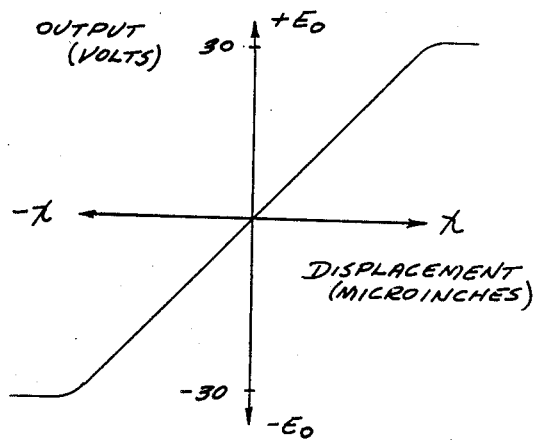
FIGURE 3 shows a typical output characteristic of the displacement transducer of FIGURE 2.

Referring now to FIGURE 2 the electrical details of a transducer which may be employed in carrying out the instant invention are shown. Transducer 2 comprises a gas-filled tube 14 having two electrodes 18 and 18' disposed therewithin. Disposed on the outside surface of tube 14 are two electrodes 16 and 16'. Electrode 16 may be excited by means of an oscillator 17 which generates a stable, amplitude controlled, electrical signal of 600 volts at a frequency of about 250 kilocycles per second. The other external electrode 16' is grounded as shown in FIGURE 2. The oscillatory field produced between electrodes 16 and 16' serves to excite the gas within tube 14 to ionization. The difference in potential to ground produced across the capacitors formed, respectively, by straightness reference member 1 and electrode 12 on the one hand, and between straightness reference 1 and electrode 13 on the other hand, by the difference in gas ion migration within tube 14 to the associated electrodes 18 and 18' result in a difference of potential across terminals 20, 21 having a highly linear useful relationship to displacement of straightness reference member 1 shown in FIGURE 3. It will be observed from consideration of FIGURE 3 that the output of this transducer bears a linear relation to the displacement of the conductive straightness reference member relative to transducer 2 which is very linear. Sensitivity is extremely high, depending on the relative positioning of electrodes 12 and 13 with respect to reference member 1, and may be, by way of example, approximately 0.2 v./% C. change. Output drift may be less than plus or minus 0.03% of full scale (plus or minus 10 mv.) per hour. Linearity may be as good as 0.1% full scale when used with an ideal capacitor. The force imposed upon the taut foil by the capacitor plates is essentially zero at center position. While the above description is made with reference to the use of a particular transducer circuit, the Decker T-42 ionization transducer, the further operation of which is detailed in United States Patents Numbers 2,696,566 and 2,696,584, it will be understood that the particular transducer employed does not constitute a part of the instant invention and that a plurality of other capacitance, and differential capacitance measuring equipment may be adapted for use in connection with the instant invention. For instance, the circuits discussed at pages 357 and 358 of "Electronic Measuring Instruments," by E. H. W. Banner may also be employed. Additionally, a number of well known alternating current bridges of the capacitance measuring variety, which are provided with well known self-balancing means, may be employed.

In operation the trueness deviation characteristic of the carriage upon which rotary table 5 is mounted may be determined by translating said carriage while observing the meter in electronic unit 11 and recording the fluctuations of this meter against a plot of the successive positions of the carriage. The same type of recording may, of course, be accomplished by many automatic recording means well known in the art. Further, if desired the displacement of conductive straightness reference member 1 with respect to plates 12 and 13 may be read on the meter in electronic unit 11 at any desired location of the carriage.

A preferred method of maintaining the conductive straightness member 1 in the optimum position is shown in FIGURES 4A and 4B. In these figures it will be seen that reference member 1 is partially wrapped at its ends around two precision made cylindrical drums 25 and 26. Drums 25 and 26 are provided with axles, or pivots, 27 and 34. The ends of reference member 1 are fastened to drums 25 and 26 by means of anchoring members 22. In the case of the foil embodiment of the conductive straightness reference member 1, it will be apparent that the ends thereof will be firmly affixed to the drums by means of clamps 22. Similarly, the wire tape embodiment of straightness reference member 1 as shown in FIGURE 6B will be secured at its opposite ends by means of clamps 22 to drums 25 and 26, care being taken that the independent individual wires of the straightness reference member of this embodiment are so secured to drums 25 and 26 by clamping means 22 that all may be "taken up" with substantially equal tension. Affixed to one end of drum 26, by means of three bolts, is tension arm 23 adapted to cooperate with screw means 24 for maintaining the tension of straightness reference member 1 when the latter is installed in a housing, as will be better understood with reference to FIGURE 5. The corresponding bolt holes shown in member 25 are used to fixedly rotationally secure member 25 to the interior of one of anchors 3 in the device of FIGURE 1.

Shown in FIGURE 5 is an additional embodiment of the instant invention which is adapted to be used for measuring carriage travel straightness in one direction. In FIGURE 5 there is shown hollow beam member, or housing, 28 which serves to rigidly maintain the spacing between drums 25 and 26, and which may be affixed by bolts passing through holes 32 to the carriage of a machine the trueness of which is to be measured. Straightness reference member 1 (not shown) is maintained in taut condition by drums 25 and 26, the former of which is maintained against rotation by bolts 29, and the latter of which may be slightly rotated about its axle 27 by means of screw 24 in order to maintain a desired tension in reference member 1. Transducer pickup 30 of FIGURE 5 is of the type described as 2 in connection with FIGURE 1 hereinabove. Transducer 30 may be rotated out of and into engagement with straightness reference member 1 by means of mounting 31. The operation of the device of FIGURE 5 is in all other respects identical with the operation of the device of FIGURE 1.

The conductive straightness reference member embodiments shown in FIGURES 6A and 6B have been described hereinabove. It should be noted that a preferred embodiment of the device of FIGURE 6B consists of a plurality of independent wires as shown in FIGURE 6B which are independently suspended at their ends by clamps 22 as shown in 4A and 4B. By this means, a construction is achieved which obviates the disadvantages of bowing or cambering characteristic of the device of the embodiment of FIGURE 6A. It will be noted from FIGURES 6A and 6B that pickup members 12 and 13 are characterized by flat faces which are located in close relation to reference member 1. In a typical construction according to the instant invention pickup plates 12 and 13 are approximately one half inch in width while the wire tape is comprised of about 300-600 wires, and is approximately one inch wide.

It will thus be seen that the objects set forth above, among those made apparent from the preceding description are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. An apparatus for dynamically measuring the straightness of travel of a movable member comprising;
   (a) elongated conductive straightness reference means consisting of a plurality of independent wire members maintained in a longitudinally tensioned state;
   (b) means mounting said reference means upon said movable member in a direction parallel to the direction of travel of said movable member;
   (c) first and second conductive pickup means;
   (d) means mounting said first and second conductive pickup means independently of said movable member and adjacent opposite sides of said reference means to thereby form first and second capacitors electrically connected in series with said reference means being a common element of said first and second capacitors;
   (e) the variation in the capacitance of said first and second capacitors as said movable member travels a linear path in the direction of the length of the wire members being indicative of the deviation from straight travel of said movable member; and
   (f) means for dynamically measuring the variation in the capacitance of said first and second capacitors as said movable member traverses said path.

2. An apparatus for measuring the straightness of travel of a carriage with respect to a base member comprising,
   (a) a ribbon-like conductive straightness reference means held in a longitudinally tensioned state;
   (b) anchoring means securing said reference means to said carriage parallel to the direction of travel of said carriage;
   (c) first and second conductive pickup means;
   (d) mounting means securing said first and second pickup means to said base and positioning both of said pickup means to form a first capacitor between said first pickup means and said reference means, and a second capacitor between said second pickup means and said reference means;
   (e) means for dynamically detecting variations of the capacitance of said first and said second capacitors as said reference means travels longitudinally between said first and second pickup means in the direction of travel of said carriage; and
   (f) means for indicating the detected variations of capacitance, said indicating means being calibrated in terms of the mechanical displacement of said reference means away from true straightness of travel.

3. The apparatus of claim 2 wherein said straightness reference means consists of a foil of metal.

4. The apparatus of claim 2 wherein said straightness reference means consists of a plurality of parallel wire members.

References Cited by the Examiner
UNITED STATES PATENTS

| | | | |
|---|---|---|---|
| 1,924,087 | 8/33 | Allen | 324—61 |
| 2,025,719 | 12/35 | Blau | 317—246 |
| 2,892,152 | 6/59 | Buisson | 324—61 |
| 2,924,810 | 2/60 | Horeth | 33—1 X |

WALTER L. CARLSON, *Primary Examiner.*

L. FORMAN, *Examiner.*